United States Patent [19]

Mobley et al.

[11] Patent Number: 5,227,409

[45] Date of Patent: Jul. 13, 1993

[54] REMOVABLE POLYURETHANE ADHESIVE

[75] Inventors: Larry W. Mobley, Cohutta, Ga.; Vivian R. Hofmeister, Lake Jackson, Tex.

[73] Assignee: The Dow Chemical Company, Midland, Mich.

[21] Appl. No.: 858,749

[22] Filed: Mar. 27, 1992

Related U.S. Application Data

[60] Division of Ser. No. 452,545, Dec. 18, 1989, Pat. No. 5,102,714, which is a continuation-in-part of Ser. No. 287,192, Dec. 20, 1988, abandoned.

[51] Int. Cl.$^5$ ............................................. C08G 18/14
[52] U.S. Cl. ...................................... 521/167; 428/85; 428/90; 428/91; 428/95; 428/97; 428/349; 428/355; 521/174; 521/175; 521/914; 525/49; 525/75; 525/77
[58] Field of Search ...................... 428/90, 91, 85, 97, 428/349, 355, 95; 528/76, 77, 49; 521/167, 174, 175, 914

[56] References Cited

U.S. PATENT DOCUMENTS

| | | |
|---|---|---|
| 2,846,408 | 8/1958 | Brochhagen et al. |
| 2,902,478 | 9/1959 | Anderson. |
| 3,317,508 | 5/1967 | Winquist. |
| 3,341,597 | 9/1967 | Rhodes. |
| 3,437,622 | 4/1969 | Dahl. |
| 3,445,525 | 5/1969 | Bormann et al. |
| 3,682,690 | 8/1972 | Amos et al. |
| 3,779,794 | 12/1973 | De Santis. |
| 3,821,130 | 6/1974 | Barron et al. |
| 3,847,647 | 11/1974 | Bahle. |
| 3,862,879 | 1/1975 | Barron et al. |
| 3,952,133 | 4/1976 | Amos et al. |
| 4,296,159 | 10/1981 | Jenkines et al. |
| 4,524,102 | 6/1985 | Hostettler. |
| 4,632,943 | 12/1986 | Nichols. |
| 4,675,232 | 6/1987 | Edenbaum et al. |
| 4,687,851 | 8/1987 | Laughner ............................ 544/398 |
| 4,696,849 | 9/1987 | Mobley et al. |
| 4,849,267 | 7/1989 | Ward et al. |
| 4,981,880 | 1/1991 | Lehmann et al. |
| 5,045,375 | 9/1991 | Davis et al. |
| 5,102,714 | 4/1992 | Mobley et al. ....................... 528/76 |

Primary Examiner—Maurice J. Welsh

[57] ABSTRACT

A polyurethane adhesive is prepared from a reaction mixture containing small amounts of chain extender material and a high equivalent weight of a polyol and a monoalcohol. An article adhered to a substrate using this adhesive is firmly affixed to the substrate, yet can be removed without leaving residual adhesive on the substrate. In addition, this adhesive can be washed and reused if desired.

22 Claims, No Drawings

REMOVABLE POLYURETHANE ADHESIVE

CROSS-REFERENCE TO RELATED APPLICATION

This is a division of the copending application of Mobley, et al. entitled "Removable Polyurethane Adhesive", Ser. No. 07/452,545, filed Dec. 18, 1989, and now issued as U.S. Pat. No. 5,102,714, which is a continuation-in-part of the copending application of Mobley entitled "Removable Polyurethane Adhesive", Ser. No. 07/287,192, filed Dec. 20, 1988, incorporated by reference and now abandoned.

BACKGROUND OF THE INVENTION

This invention relates to polyurethane adhesives, and to substrates coated with a layer of a polyurethane adhesive.

Polyurethane adhesives and sealants of various types are well known. See, e.g., U.S. Pat. Nos. 3,779,794, 4,624,996 and 4,625,012.

In certain applications, it is desirable to provide an adhesive which, once applied to a substrate and cured, can be removably attached to an underlying surface. For these applications, a combination of tenacious bonding and yet virtual absence of residual adhesive on the underlying surface upon removal is desired. Upon removal, the exposed adhesive often picks up dirt and dust. It is further desirable that the adhesive is such that it can be washed without destroying its tackiness.

An example of such an application is carpet, especially carpet tiles or automotive floor mats, which must be adhered to the floor or other substrate. This is often done by applying a pressure sensitive adhesive to the floor, and applying the carpet to the adhesive. Although the carpet is easily removed when applied in this manner, the adhesive stays with the floor when the carpet is removed. Moreover, the adhesive often bonds too strongly to the carpet, and weaker carpet backings such as polymeric foams often tear and leave portions of the backing attached to the floor. This increases the difficulty to completely removing the carpet.

It would be desirable to provide a polyurethane adhesive which adheres tenaciously to a substrate, yet is cleanly removable and washable.

SUMMARY OF THE INVENTION

In one aspect, this invention is a polyurethane adhesive which is the reaction produce of a reaction mixture comprising:

(a) a mixture of a monoalcohol and a polyether or polyester polyol, the mixture having an equivalent weight of at least about 500 and containing from about 10 to about 70 mole percent monoalcohol, (b) less than 10 weight percent, based on the weight of component (a) of a compound or mixture of compounds having at least two active hydrogen-containing groups per molecule and an equivalent weight from about 30 to about 500, and (c) an organic polyisocyanate or mixture thereof having an average functionality of about 2.2 or less, in an amount sufficient to provide an isocyanate index of about 85 to about 115, said reaction mixture containing no greater than about 0.1 weight percent of water, based on component (a).

In another aspect, this invention is a substrate coated with the polyurethane adhesive of this invention.

The polyurethane adhesive of this invention has several unexpected beneficial properties. Despite being fully cured, it has excellent inherent tack, and therefore adheres tenaciously to many substrates. After application and curing, as described herein, it requires no "open-time" to development tackiness. Often, a substrate bearing this adhesive can be sold or transported with a release backing layer over the adhesive. Upon removal of the backing layer, the adhesive is ready for immediate use. Because no large excess of isocyanate is used, there are no problems associated with users handling reactive chemicals. Accordingly, this adhesive can be applied to substrates which then can be easily and safely installed by consumers. This adhesive is also releaseable, and pulls cleanly from the surface to which it is adhered without leaving a significant residual film. Further, the adhesive layer is washable with water. Hence, this adhesive is particularly useful in applications where it is desired to provide a substrate which is removable from the surface to which it is adhered. In those applications, the adhesive layer often picks up dirt and foreign objects which, if not removed, decrease the effectiveness of the adhesive layer. The adhesive of this layer can be washed with water or other non-solvents for the polyurethane, and when dried, retains its tackiness.

DETAILED DESCRIPTION OF THE INVENTION

The adhesive of this invention is the reaction product of a reaction mixture containing a certain high equivalent weight polyol mixture containing significant quantities of monoalcohols, low or negligible quantities of "chain extender" compounds and an organic polyisocyanate, wherein the reaction mixture is substantially devoid of water.

The polyol mixture used herein is a polyether or polyester polyol or mixture thereof containing about 10 to about 70, preferably about 10 to about 60, more preferably about 23 to about 50 mole percent of a monoalcohol. The polyol mixture advantageously has a hydroxyl equivalent weight of at least about 500, preferably at least about 900, more preferably at least about 1200. The upper range of equivalent weight for the polyol mixture is not especially critical as long as the polyol mixture is a liquid or low melting solid, but those polyol mixtures having an equivalent weight of less than about 5000, more preferably less than about 3500, most preferably less than about 3000 are preferred because they have relatively low viscosities, and are therefore easier to process into polyurethanes. In some instances, when polyols having an average equivalent weight in excess of about 1900 are used, the range of isocyanate index which provides good tackiness has been found to be small. This can make commercial processing difficult, and so equivalent weights in excess of about 1900 are less preferred for that reason.

The polyether also advantageously has a nominal functionality (exclusive or monofunctional impurities) of about 2 to about 4, preferably about 2 to about 3.

The monoalcohol may be an impurity formed in the manufacture of the polyol (in the case of polyether polyols), or a separately manufactured material which is added to the polyol. In the case of polyether polyols, the monoalcohol is preferably a monofunctional polyether impurity which is generated in the polyol manufacture. In the preparation of polyethers, an alkylene oxide is added to a polyhydric initiator to form polyether chains. Under the conditions of the polymerization of alkylene oxides, certain alkylene oxides isomerize to the corresponding unsaturated alcohol. This alcohol then acts as a monofunctional initiator for polyether formation. As a result, the polyether polyol so formed contains a significant quantity of monofunctional polyethers having a terminal carbon-carbon double bond. The quantity of such monoalcohols can readily be determined by measurement of the quantity of this terminal unsaturation, which is equal to the quantity of monofunctional polyethers.

Unsaturation levels which provide a molar proportion of monoalcohols in the polyol mixture within the aforementioned ranges depend on the nominal functionality and the equivalent weight of the mixture. For a 2000 equivalent weight nominal diol, 0.2 meq/g of unsaturation corresponds to a monoalcohol content of about 58 mole percent. For a like diol, 0.15 meq/g of unsaturation corresponds to about 47 mole percent monoalcohol, and 0.1 meq/g corresponds to about 33 mole percent monoalcohol. For a 2000 equivalent weight nominal triol, 0.2 meq/g unsaturation corresponds to about 67 mole percent monoalcohol, 0.15 meq/g unsaturation corresponds to about 50 mole percent monoalcohol, 0.1 meq/g unsaturation corresponds to about 43 mole percent monoalcohol and 0.05 meq/g unsaturation corresponds to about 25 mole percent monoalcohol.

Since propylene oxide is the alkylene oxide which most readily undergoes isomerization to the unsaturated alcohol, poly(propylene oxide) polyols are most preferred herein. Thus, polyols prepared by polymerizing propylene oxide or a mixture containing at least about 50, more preferably at least about 70, weight percent propylene oxide are preferred. Particularly preferred are polyethers prepared by adding propylene oxide to an initiator having from about 2 to about 3 active hydrogen atoms, to form a poly(propylene oxide) having an equivalent weight of at least about 800, and then reacting same with ethylene oxide to form a poly(ethylene oxide) "cap" comprising about 10 to about 25, more preferably about 14 to about 20 percent of the weight of the resulting product. Polyethers made in this manner have significant quantities of monoalcohol impurities due to the use of propylene oxide, and have relatively high reactivity due to the presence of primary hydroxyl groups formed in the ethylene oxide capping step.

Polyethers containing monoalcohol impurities are conveniently prepared according to processes described in U.S. Pat. Nos. 2,902,478, 3,040,076, 3,317,508, 3,341,597 and 3,445,525, incorporated herein by reference. The preferred process comprises adding an alkylene oxide to a polyhydric initiator using an alkali metal hydroxide catalyst and elevated temperatures and pressures. The isomerization of alkylene oxides, particularly propylene oxide, is favored by using relatively high catalyst concentration and higher temperatures. A catalyst concentration of about 0.01 to about 5 weight percent, based on product polyol and a temperature of about 90° C. to about 160° C., preferably about 95° C. to about 140° C., is desirable.

Of particular interest as component (a) are:
(1) nominally difunctional polymers of propylene oxide (PO) or a random copolymer of a major amount of PO and a minor amount of ethylene oxide (EO), optionally containing an EO cap as described before, having an equivalent weight of about 900 to about 2000, preferably about 1000 to about 1900, and about 0.05 to about 0.15 meq of terminal unsaturation/gram;
(2) mixtures of (i) nominally di- or trifunctional polymers of (PO) or a random copolymer of a major amount of PO and a minor amount of (EO), optionally containing an EO cap as described before and having an equivalent weight of at least about 1500 and (ii) a nominally difunctional polymer of (PO) or a random copolymer of a major amount of PO and a minor amount of (EO), optionally containing an EO cap as described before, having an equivalent weight of about 900 to about 1499, the mixture having an average equivalent weight from about 1100 to about 1800 and about 0.05 to about 0.15 meq of terminal unsaturation/gram; and
(3) nominally trifunctional polymers of propylene oxide (PO) or a random copolymer of a major amount of PO and a minor amount of ethylene oxide (EO), optionally containing an EO cap as described before, having an equivalent weight of about 1300 to about 2000, and about 0.05 to about 0.15 meq of terminal unsaturation/gram.

In all of (1)–(3) above, it is preferred that the average actual functionality of the component (a) be less than about 2.2, and more preferably about 1.8 to about 2.1.

Alternatively, the monoalcohol can be specially prepared in various processes and used to form a mixture with the polyol. The separately prepared monoalcohol is advantageously compatible with the polyol, preferably being of similar composition and equivalent weight. The equivalent weight of the specially prepared monoalcohol is such that the mixture thereof with the polyol has an average equivalent weight as described before.

For example, a polyether monoalcohol can be prepared directly by alkoxylating a monohydric initiator. Suitable conditions for this alkoxylation are as described with respect to the preparation of the polyether polyols. The alkoxylation of the monohydric initiator may be conducted separately from the preparation of the polyol, with the resulting monoalcohol compound being blended with polyol in the relative proportions stated before. However, it is possible to form a mixture of monohydric and polyhydric initiators, and to alkoxylate the mixture, thereby forming a mixture of polyols and monoalcohol compounds directly. When the monoalcohol material is prepared separately from the polyol, it is preferred that its composition be such that it is compatible with the polyol. In the case of polyethers, compatibility is promoted by the use of the same alkylene oxides, and the formation of comparable equivalent weight products.

Suitable monohydric initiators include monohydric alcohols having 1 to 12 carbon atoms, glycol monoethers having 2 to 6 carbon atoms in the glycol moiety, and dimethyl, -ethyl, -propyl or -butyl ethers of triols such as glycerol and trimethylolpropane, monocarboxylic acids such as acetic acid, benzoic acid and the like, mono-secondary amines such as diethyl amine and methyl ethyl amine, and the like. The preferred monohydric initiators include methanol, ethanol, propanol, butanol, alkylene oxide adducts of methanol, monoalkylethers of di- and triethylene or -propylene glycols and such like.

Suitable monohydroxy-containing polyethers are commercially available, and these commercially available monoalcohols, particularly those which are primarily polymers of propylene oxide, are suitably used in this invention.

The polyol mixture is reacted with an organic polyisocyanate or mixture thereof having an average functionality of $\leq 2.2$, preferably about 1.9 to about 2.15. Either aliphatic or aromatic polyisocyanates can be used in this invention. Suitable aliphatic polyisocyanates include ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and -1,4-diisocyanate, 1,5-diisocyanato-3,3,5-trimethylcyclohexane, 2,4- and/or 2,6-hexahydrotoluene diisocyanate, perhydro-2,4'- and/or -4,4'-diphenylmethanediisocyanate ($H_{12}MDI$), isophorone diisocyanate, and the like.

Suitable aromatic polyisocyanates include, for example, 2,4- and/or 2,6-toluene diisocyanate (TDI), 2,4'-diphenylemthanediisocyanate, 1,3- and 1,4-phenylene diisocyanate, 4,4'-diphenylmethane diisocyanate (including mixtures thereof with minor quantities of the 2,4'-isomer), 1,5-naphthylene diisocyanate, triphenylmethane-4,4',4"-triisocyanate, polyphenylpolymethylene polyisocyanates, and the like. Trifunctional or higher functionality isocyanates, however, must be used in admixture with diisocyanates so that the functionality of the mixture is $\leq 2.2$.

In addition, derivatives and prepolymers of the foregoing polyisocyanates such as those containing urethane, carbodiimide, allophanate, isocyanurate, acylated urea, biuret, ester and similar groups are useful herein. Of these, prepolymers of TDI and MDI and the so-called "liquid MDI" products which contain carbodiimide groups and have an equivalent weight of about 130-150 are of particular significance.

Of the foregoing polyisocyanates, TDI, MDI, isophorone diisocyanate, $H_{12}MDI$, hexamethylene diisocyanate, cyclohexane diisocyanate and derivatives thereof are preferred due to their cost, commercial availability and performance. TDI, MDI and derivatives and prepolymers of MDI having an equivalent weight of about 190 or less are most preferred.

The polyisocyanate is advantageously used in an amount sufficient to provide an isocyanate index of about 85-115, preferably about 90-110, more preferably about 90-100. At higher indices, trimerization of the polyisocyanate occurs, causing the polyurethane to become less flexible than desired. At lower indices, the polyurethane is undercured, and has poor physical properties, especially low tensile strength.

In addition to the polyol mixture and the polyisocyanate, a chain extender material may be and preferentially is used in minor quantities, especially if the polyol is nominally difunctional. "Chain extenders", for the purposes of this invention, include compounds having about two to about four active hydrogen-containing groups per molecule and an equivalent weight from about 30 to about 500, preferably about 30 to about 150, more preferably about 53 to about 100. It has been found that tack is better maintained over time when the chain extender has a functionality in excess of about 2.2 and an equivalent weight in the more preferred range. The use of minor amounts of chain extender provides physical property enhancements. However, when the chain extender exceeds about 10 percent, based on the weight of the polyol mixture, decreased elongation and tackiness are seen, so the chain extender level advantageously does not exceed that amount. Preferred levels of chain extender are from about 0 to about 7, more preferably about 1 to about 5 parts by weight per 100 parts by weight polyol mixture, when the polyol component thereof has a nominal functionality of 3 or greater. When the polyol component(s) of the polyol mixture have an average nominal functionality of less than 3, the preferred levels of chain extender are from about 0.5 to about 8, more preferably about 1 to about 5 parts by weight per 100 parts by weight polyol mixture.

In particularly preferred embodiments using chain extenders of mixtures thereof with an average functionality of at least about 2.2, the chain extender is advantageously used in an amount which provides from about 0.2, preferably about 0.3, more preferably about 0.45, up to about 1.2, preferably up to about 0.9, more preferably up to about 0.6 equivalents of chain extender per equivalent of component (a). This is particularly advantageous when the chain extender is or comprises a major amount of a tertiary amine-containing compound.

Hydroxyl-containing chain extenders include the alkylene glycols and glycol ethers such as ethylene glycol, 1,3-propylene glycol, 1,4-butylene glycol, 1,6-hexamethylene glycol, diethyl glycol, triethylene glycol, dipropylene glycol and tripropylene glycol, as well a low equivalent weight polyethers initiated with di- to tetrahydric initiators, and the like. Among the alkylene glycols and glycol ethers, glycol ethers having an equivalent weight of about 53 to about 100 are preferred. These include diethylene glycol, triethylene glycol, dipropylene glycol, tripropylene glycol and the like. Among the low equivalent weight polyethers, those having an equivalent weight from about 53 to about 300, more preferably about 75 to about 100 and which are initiated with polyols or polyamines such as ethylene diamine are especially preferred. These include propylene and/or ethylene oxide adducts of ethylene diamine and/or glycerine. Hydroxy-functional compounds having tertiary nitrogen atoms are of particular interest, as these provide some catalytic activity which promotes curing while simultaneously allowing the use of reduced levels of other catalysts. Among these hydroxy-functional compounds are alkanolamines such as triethanolamine, triisopropanolamine, alkyldiethanolamine, alkyldiisopropaneolamine and the amine-initiated polyethers of about 53 to about 100 equivalent weight. Amine chain extenders include diethyltoluene diamine, phenylene diamine, methylene bis(o-chloroaniline), NaCl blocked methylene bis(aniline), toluene diamine, aromatic diamines which are substituted at least one of the carbon atoms adjacent to the amine groups with a lower alkyl group, and the like. These amine chain extenders, however, ar less preferred.

Generally, the reaction mixture may contain additional components such as catalysts, surfactants, colorants, fillers, flame retardants, antioxidants, antistatic agents and the like, which may vary according to the desired attributes of the adhesive. Among the catalysts, those described in U.S. Pat. Nos. 2,846,408 and 4,632,943 are suitable, with tertiary amine catalysts and organometallic catalysts, especially organotin, organoiron and organobismuth catalysts being preferred. Fillers and colorants such as carbon black, titanium oxide, alumina, calcium carbonate and the like add a desired color and often reduces the cost of the adhesive. Up to about 200, preferably about 0 to about 100, more preferably about 0 to about 30 parts by weight filler are used per 100 parts by weight polyol mixture. Above these levels, physical properties and tack are adversely affected.

It is generally desirable for most applications not to employ a blowing agent, as a non-cellular adhesive is usually stronger and thus performs better. However, it is within the scope of this invention to employ a blowing agent to form a cellular adhesive, provided the proscription against the use of significant amounts of water is followed. Suitable blowing agents include low boiling alkanes, halogenated alkanes, the so-called "azo" blowing agents, as well as other materials which generate a gas under the conditions encountered in the curing of the adhesive. When a cellular adhesive is desired, a preferred amount of producing such cells involves whipping a gas such as air, nitrogen, argon, carbon dioxide and the like into the reaction mixture. Equipment such as an Oakes foamer is suitable for this purpose.

The adhesive is formed by mixing the components and applying the mixture to a substrate which it is cured to a polyurethane. Application can be done in any convenient manner, such as through the use of a doctor blade to form the curing reaction mixture into a layer on the substrate. Curing can be done by any convenient method, although the preferred method is by the application of heat, such as is obtained by using a convection oven, infrared lamps and the like. Heat is applied for a period of time sufficient to completely cure the mixture. Curing can be monitored by measuring the quantity of free isocyanate groups in the reaction mixture. Complete curing is evidenced by a substantial absence of isocyanate groups. Generally, heating at a temperature of about 90° to about 200° C. for a period of about 1 minute to about 2 hours is sufficient to completely cure the polyurethane.

The cured polyurethane so formed has inherent tack. In addition, it has the very desirable property of adhering tenaciously to a variety of surfaces, yet being removable. Further, on removal, the polyurethane adhesive leaves very little or no residual polymer on the underlying surface. This property renders this adhesive particularly useful in applications requiring removal and reinstallation of the article employing the adhesive.

The substrate to which the adhesive is applied is not in itself particularly critical. However, several types of substrates are generally preferred because the adhesive sticks better to them. These substrates include those which (a) are porous, (b) are wettable by the reaction mixture from which the adhesive is formed, (c) contain small quantities of absorbed water or small quantities of reactive hydroxyl or amine groups or (d) are polyurethanes.

Substrates of particular interest herein are textiles, especially carpets, and most especially carets which contain a polymeric backing such as a synthetic latex or polyurethane backing. Other substrates of interest include paper, plastics, cloth, wood, metals and the like. For instance, an easily installed and removed plastic or fabric drop cloth can be readily prepared by applying the adhesive of this invention to the plastic or fabric, so the resulting drop cloth can be glued into place and cleanly and easily removed when no longer needed.

As mentioned before, carpet is often glued down into place using pressure sensitive adhesives. It is often desirable to remove the carpet and reinstall it. In doing so, the adhesive stays with the floor and must be removed unless new carpet is installed. With this invention, the adhesive is applied to the underside of the carpet and remains with the carpet after the carpet is installed and subsequently removed. With certain types of carpet, such as automobile floor mats, entry mats, carpet tile and the like, the adhesive layer often picks up particulate matter such as dirt or dust during use. This particulate matter reduces the available adhesive surface area, and thus renders it less effective. For this reason, it is desirable to clean the adhesive to remove this matter. With most adhesives, washing is wither ineffective to remove such particulate matter, or else destroys the adhesive. The adhesive of this invention, however, is washable with water and ordinary water-soluble detergents and soaps. Low-sudsing detergents are preferred when a detergent is used. However, the use of detergents and soaps is less preferred because their use may tend to reduce the tackiness of the adhesive. Solvent-based cleaners can also be used provided they do not excessively swell or dissolve the polyurethane and do not damage the substrate. Upon cleaning and subsequent drying, the tackiness of the adhesive layer is restored.

Particularly suitable polyurethane-backed carpets include those having a substantially non-cellular backing as described, for example, in U.S. Pat. Nos. 4,696,849 and 4,296,159, as well as those having a cellular backing, as described in U.S. Pat. Nos. 3,821,130 and 3,862,879. The carpet itself advantageously comprises a woven or tufted facing layer, with a primary backing having a facing tufted therethrough being the preferred carpet material. The polyurethane backing is non-tacky and can be cellular or non-cellular. When a non-cellular polyurethane backing is used, it is still preferred to employ a substantially non-cellular polyurethane precoat which is attached directly to the carpet material, and to which the cellular polyurethane backing is attached.

The polyurethane adhesive of this invention can be applied directly to the polyurethane backing. In the most preferred embodiment, however, a non-woven scrim is partially embedded into a cellular polyurethane backing, and it is onto the exposed surface of this scrim that the adhesive is applied. Thus, the most preferred carpet comprises a facing layer coated with a non-cellular, non-tacky polyurethane, which is coated with a cellular, non-tacky polyurethane cushion layer into which a non-woven scrim is partially embedded, and the adhesive of this invention applied to the exposed surface of said scrim.

The adhesive of this invention can be applied to a backing of a releasable material, and covered with another layer of such a material, to form a two-sided adhesive of predetermined size and shape. In this embodiment, the adhesive is advantageously cellular for many applications, such as gasketing. When the release material is removed, such two-sided adhesive is useful for gluing two or more objects together, and also as a gasketing material. Similarly, a single substrate can be coated on both sides with the adhesive of this invention to form a two-sided tape, adhesive or gasketing material.

Other uses for this invention will be apparent to those skilled in the art.

The following examples are given to illustrate the invention but are not intended to limit the scope thereof. Unless stated otherwise, all parts and percentages are given by weight.

EXAMPLE 1

In this example, the adhesive of this invention is applied to a tufted carpet bearing a non-cellular polyurethane backing. The polyurethane backed carpet is prepared according to the teachings of U.S. Pat. No. 4,696,849 to Mobley.

A polyurethane adhesive is prepared from the following formulation:

TABLE 1

| Component | Parts by Weight |
| --- | --- |
| Polyol A(1) | 98 |
| Amine-initiated polyol(2) | 2 |
| Carbon Black Dispersion(3) | 1 |
| Organotin Catalyst | 0.05 |
| Isocyanate Prepolymer(4) | 14.9 (100 index) |

(1) A 2000 equivalent weight, nominally difunctional, ethylene-oxide terminated poly(propylene oxide) having 0.10 meq. unsaturation/gram and 18 weight percent ethylene oxide capping.
(2) An 278 molecular weight propylene oxide adduct of aminoethylethanolamine.
(3) A commercially available dispersion of carbon black in a polyether polyol.
(4) 181 equivalent weight hard segment prepolymer of diphenylmethanediisocyanate having an average functionality of about 2.0.

Polyol A, the amine-initiated polyol and carbon black are thoroughly mixed with minimal entrainment of air. The prepolymer is then added and thoroughly mixed, followed by addition and mixing in of catalyst, again with minimal air entrainment. This mixture is then applied to the polyurethane backing of the carpet sample, and cured in an oven at 130° C. for six minutes. Upon removal from the oven, the adhesive layer is covered with a polyethylene barrier film. The barrier film sticks tenaciously to the adhesive layer, but when the barrier film is removed, the adhesive layer stays with the carpet. The barrier film is essentially free of residual adhesive. The adhesive layer retains its tack upon prolonged exposure to the air.

EXAMPLE 2

In this example, the adhesive of this invention is applied to a tufted carpet bearing a frothed polyurethane cushion backing. The polyurethane-backed carpet is prepared according to the general teaching of U.S. Pat. No. 3,862,879.

An adhesive of this invention is applied to the polyurethane surface of the carpet sample as indicated in Example 1. After the adhesive layer cools to room temperature, the barrier film is removed, and the sample attached to a substrate by contacting the substrate with the adhesive layer. The carpet sample and substrate are placed in a 150° F. oven for two weeks, after which time the adhesive remains firmly bonded to the substrate. The carpet sample and substrate are placed outdoors for one month, and again the adhesive remains firmly bonded to the substrate. After the outdoor exposure, the carpet sample is removed from the substrate. The substrate is free of residual adhesive. The adhesive layer is still tacky, and adheres tightly to the substrate when reapplied thereto.

EXAMPLE 3

A polyurethane-backed carpet with a non-woven scrim release backing is prepared by applying a frothed polyurethane-forming composition to the back of a carpet sample, and prior to curing, applying a non-woven polyester scrim to the surface of the polyurethane-forming composition layer so that, when the composition is cured, the scrim is adhered to the surface of the frothed polyurethane layer. The polyurethane-forming composition is as described in U.S. Pat. No. 3,862,879. The product so prepared is as described in U.S. Pat. No. 4,853,280.

An adhesive layer of this invention is applied to the release backing layer of the carpet sample, as described in Example 1. Excellent adhesive properties are obtained. The adhesive layer adheres strongly to a variety of substrates, yet can be removed easily, leaving essentially no residual adhesive on the substrate.

EXAMPLE 4

Example 2 is repeated, this time using an adhesive having the formulation:

TABLE 2

| Component | Parts by Weight |
| --- | --- |
| Polyol A(1) | 30 |
| Polyol B(2) | 70 |
| Organotin Catalyst | 0.05 |
| Isocyanate Prepolymer(3) | 9.4 (100 index) |

(1) A 2000 equivalent weight, nominally difunctional poly(propylene oxide) having 0.10 meq. unsaturation/gram and 18 weight percent ethylene oxide capping.
(2) A 2000 equivalent weight, nominally trifunctional poly(propylene oxide) having 0.8 meq. unsaturation/gram and 17 weight percent ethylene oxide capping.
(3) A 181 equivalent weight hard segment prepolymer of diphenylmethanediisocyanate having an average functionality of about 2.0.

Comparable results are obtained. Because some crosslinking is incorporated into the adhesive through the use of a trifunctional polyol, good results are obtained even though no chain extender is used.

EXAMPLE 5

Example 1 is repeated, this time using an adhesive having the formulation:

TABLE 3

| Component | Parts by Weight |
| --- | --- |
| Polyol A(1) | 96 |
| Diethylene glycol | 4 |
| Organotin Catalyst | 0.05 |
| Isocyanate Prepolymer(2) | 23.2 (100 index) |

(1) A 2000 equivalent weight, nominally difunctional, poly(propylene oxide) having 0.10 meq. unsaturation/gram and 18 weight percent ethylene oxide capping.
(2) A 181 equivalent weight hard segment prepolymer of diphenylmethanediisocyanate having an average functionality of about 2.0.

Again, excellent tack is obtained, and the adhesive is readily removed from an underlying substrate, leaving only a small amount of residual polymer on the substrate.

EXAMPLE 6

An automobile car mat made of a tufted carpet backed with a noncellular polyurethane backing is coated with an adhesive prepared according to the general method described in Example 1. The resulting mat is placed over the carpet on the floor on the front driver's side of an automobile. The automobile is used normally for several weeks, during which time the mat remains fixed firmly into place. After two weeks, the mat is removed. It removes cleanly from the underlying carpet. The underlying carpet shows no signs of staining, marring, residual adhesive, or any other adverse effects from being in contact with the adhesive of the car mat. Because the adhesive layer has picked up dirt from the carpet, it is washed with soap and water. The dirt is easily cleaned off the adhesive layer. The cleaned mat is then permitted to air dry. When the dried mat is reinstalled, it adheres to the underlying carpet as strongly as before.

EXAMPLE 7

Using the general method described in Example 1, several adhesives of this invention are prepared and evaluated using a rolling ball test (ASTM 3121). The rolling ball test is conducted immediately after curing, and then again after the sample has aged one week at ambient conditions. The formulations used and the results of the rolling ball test are as indicated in Table 4 following. Sample 7-A, which employs a amine-initiated chain extender, displays the best combination of cure and tack.

TABLE 4

| Component/Property | Sample No. | | | |
|---|---|---|---|---|
| | 7-A | 7-B | 7-C | 7-D |
| Polyol A[1] | 98 | 0 | 0 | 97.4 |
| Polyol C[2] | 0 | 98 | 98 | 0 |
| Chain Extender A[3] | 2 | 0 | 0 | 0 |
| Glycerine | 0 | 2 | 0 | 0 |
| Chain Extender B[4] | 0 | 0 | 2 | 0 |
| Chain Extender C[5] | 0 | 0 | 0 | 2.6 |
| Isocyanate Prepolymer (index)[6] | 100 | 0 | 0 | 100 |
| Isocyanate Blend[7] | 0 | 100 | 100 | 0 |
| Carbon Black | 0.3 | 0.3 | 0.3 | 0.3 |
| Organotin catalyst A[8] | 0 | 0.06 | 0.06 | 0 |
| Topcat 230 | 0 | 0.06 | 0.06 | 0 |
| Organotin catalyst B[9] | 0.03 | 0 | 0 | 1.0 |
| Cure Time, min | 3 | 3 | 5 | 7 |
| Hot Roll Ball Tack, cm | 0.8 | 1.0 | 0.5 | 0.7 |
| Hot Roll Ball Tack, 1 week, cm | 0.8 | 4.0 | 0.7 | 0.7 |

[1] See Table 1.
[2] A 2125 equivalent weight nominally difunctional poly (PO) having about 0.12 meq/g terminal unsaturation.
[3] See note [2] in Table 1.
[4] An adduct of glycerin and PO having an equivalent weight of 88.
[5] An adduct of trimethylolpropane and EO having an equivalent weight of 91.
[6] See note [3] of Table 1.
[7] A 60/40 blend of the isocyanate prepolymer of note [6] and a 143 equivalent weight liquid MDI. The blend has an average functionality of about 2.0.
[8] UL-28, sold by Witco Company.
[9] UL-6, sold by Witco Company.

EXAMPLE 8

Example 1 is repeated, except the organotin catalyst level is reduced to 0.03 parts by weight, the isocyanate index is reduced to 85, and curing is done at 250° F. for 10 minutes. A carpet precoated with a non-cellular polyurethane backing is the substrate. Using the same formulation, a free-standing adhesive is prepared by curing the formulation in a 5"×5"×⅛ stainless steel mold which is sprayed with a mold release agent. After curing for 10 minutes at 250° F., the samples are demolded and covered with a polyethylene barrier film until ready for testing. These adhesives are designed Sample No. 8-A for convenience.

The rolling ball test is conducted on the free-standing samples, after removal of the barrier film. Results are as indicated in Table 5. To the adhesive layer of the carpet samples are attached a second piece of a tufted carpet, with the face of the carpet contacting the adhesive layer. There is an overlap of 3"×1" between the adhesive layer and the face of the second piece of carpet. A load of 0.5 psi is applied to this assembly for three days at room temperature. The assembly is then tested with an MTS tensile tester to determine tensile shear strength. The grips of the MTS are spread apart at the rate of 10"/minute until the specimen is pulled apart. The maximum load is measured and divided by surface area to obtain the results indicated in Table 5.

A second formulation (Sample No. 8-B) is prepared in like manner as Sample 8-A, except Polyol A is replaced with a 934 equivalent weight, nominally difunctional poly(propylene oxide) having an EO cap of 17.1 weight percent and 0.02 meq/g unsaturation. The results are as indicated in Table 5.

A third formulation (Sample No. 8-C) is prepared in like manner as Sample 8-A, except Polyol A is replaced with a 1000 equivalent weight, nominally difunctional poly(propylene oxide) having 0.03 meq/g unsaturation. The results are as indicated in Table 5. All samples exhibit good adhesion.

TABLE 5

| | Property | |
|---|---|---|
| Sample No. | Rolling Ball Test, cm | Tensile Shear Test, lb/in$^2$ |
| 8-A | 0.62 | 1.4 |
| 8-B | 0.66 | 2.3 |
| 8-C | 0.49 | 2.7 |

In addition, a fourth formulation is prepared, substituting 98 parts of a 26/72 mixture of a difunctional 650 molecular weight poly(tetramethyleneoxide) and a 1828 molecular weight monofunctional random copolymer of 85 weight % PO and 15% weight EO for the polyol in Example 1. This formulation exhibited a value of about 0.7 lb/in$^2$ on the tensile shear test and 0.52 cm on the rolling ball test.

What is claimed is:

1. A polyurethane adhesive which is the reaction product of a reaction mixture comprising:
   (a) a mixture of a monoalcohol and a polyether or polyester polyol, the mixture having an average actual functionality of 2.2 or less, an equivalent weight of at least about 500 and containing from about 10 to about 70 mole percent monoalcohol,
   (b) less than 10 weight percent, based on the weight of component (a) of a compound or mixture of compounds having at least two active hydrogen-containing groups per molecule and an equivalent weight from about 30 to about 500, and
   (c) an organic polyisocyanate or mixture thereof having an average functionality of about 2.2 or less, in an amount sufficient to provide an isocyanate index of about 85 to about 115, said reaction mixture containing no greater than about 0.1 weight percent of water, based on component (a).

2. The adhesive of claim 1 wherein component (a) is a polyether polyol or mixture thereof having about 0.05 to about 0.15 meq/g of unsaturated monoalcohol impurities.

3. The adhesive of claim 2 wherein component (b) has an average functionality of at least about 2.2 and an equivalent weight from about 30 to about 100.

4. The adhesive of claim 3 wherein the reaction mixture contains about 0.3 to about 1.2 equivalent of component (b) per equivalent of component (a).

5. The adhesive of claim 4 wherein component (a) is a nominally difunctional polymer of PO or a random copolymer of a major amount of PO and a minor amount of EO having an equivalent weight of about 900 to about 2000.

6. The adhesive of claim 5 wherein component (b) is an alkanolamine or an amine-initiated polyether.

7. The adhesive of claim 6 wherein component (a) contains an ethylene oxide cap comprising about 10 to about 25 weight percent of the polymer.

8. The adhesive of claim 4 wherein component (a) is a mixture of (i) nominally di- or trifunctional polymer of PO or a random copolymer of a major amount of PO and a minor amount of EO having an equivalent weight of at least about 1500 and (ii) a nominally difunctional polymer of PO or a random copolymer of a major amount of PO and a minor amount of EO having an equivalent weight of about 900 to about 1499, the mixture having an average equivalent weight from about 1100 to about 1800 and about 0.05 to about 0.15 meq of terminal unsaturation/gram.

9. The adhesive of claim 8 wherein component (b) is an alkanolamine or an amine-initiated polyether.

10. The adhesive of claim 9 wherein component (a) contains an ethylene oxide cap comprising about 10 to about 25 weight percent of the polymer.

11. The adhesive of claim 4 wherein component (a) is a nominally trifunctional polymer of PO or a random copolymer of a major amount of PO and a minor amount of EO having an equivalent weight of about 1300 to about 2000.

12. The adhesive of claim 11 wherein component (b) is an alkanolamine or an amine-initiated polyether.

13. The adhesive of claim 12 wherein component (a) contains an ethylene oxide cap comprising about 10 to about 25 weight percent of the polymer.

14. The adhesive of claim 2 wherein component (b) is a polyether polyol or an alkylene glycol ether having an equivalent weight from about 30 to about 100.

15. The adhesive of claim 14 wherein said polyether polyol of component (a) is nominally difunctional, and said reaction mixture contains about 0.5 to about 8 weight percent of component (b).

16. The adhesive of claim 15 wherein said polyether polyol of component (a) has an average nominal functionality of at least about 2.2, and said reaction mixture contains about 1 to about 5 weight percent of component (b).

17. The adhesive of claim 1 which is cellular.

18. A substrate coated with the polyurethane adhesive of claim 1.

19. A substrate coated with the polyurethane adhesive of claim 2.

20. A substrate coated with the polyurethane adhesive of claim 5.

21. A substrate coated with the polyurethane adhesive of claim 8.

22. A substrate coated with the polyurethane adhesive of claim 11.

* * * * *